(12) United States Patent
Jia et al.

(10) Patent No.: US 10,887,566 B2
(45) Date of Patent: Jan. 5, 2021

(54) IMAGE DISPLAY SYSTEM

(71) Applicants: Huawei Technologies Co., Ltd., Shenzhen (CN); Cambridge Enterprise Limited, Cambridgeshire (GB)

(72) Inventors: Jia Jia, Cambridgeshire (GB); Jhensi Chen, Cambridgeshire (GB); Daping Chu, Cambridgeshire (GB); Jun Yao, Shenzhen (CN)

(73) Assignees: Huawei Technologies Co., Ltd., Shenzhen (CN); Cambridge Enterprise Limited, Cambridgeshire (GB)

( * ) Notice: Subject to any disclaimer, the term of this patent is extended or adjusted under 35 U.S.C. 154(b) by 0 days.

(21) Appl. No.: 16/564,921

(22) Filed: Sep. 9, 2019

(65) Prior Publication Data

US 2019/0394436 A1    Dec. 26, 2019

Related U.S. Application Data

(63) Continuation of application No. PCT/CN2017/114162, filed on Dec. 1, 2017.

(30) Foreign Application Priority Data

Mar. 9, 2017   (CN) .......................... 2017 1 0138748

(51) Int. Cl.
*H04N 9/31*     (2006.01)
*H04N 13/383*   (2018.01)

(52) U.S. Cl.
CPC ......... *H04N 9/3185* (2013.01); *H04N 9/3188* (2013.01); *H04N 13/383* (2018.05)

(58) Field of Classification Search
CPC ... H04N 9/3185; H04N 9/3188; H04N 13/383
See application file for complete search history.

(56) References Cited

U.S. PATENT DOCUMENTS

| | | | | |
|---|---|---|---|---|
| 8,581,965 | B2 * | 11/2013 | Chang | G02B 30/36 |
| | | | | 348/50 |
| 8,587,498 | B2 * | 11/2013 | Connor | G09G 3/3473 |
| | | | | 345/6 |
| 10,051,261 | B2 * | 8/2018 | Guo | G02B 26/0875 |

(Continued)

FOREIGN PATENT DOCUMENTS

| | | |
|---|---|---|
| CN | 102169283 A | 8/2011 |
| CN | 102183873 A | 9/2011 |

(Continued)

*Primary Examiner* — Peter D McLoone
(74) *Attorney, Agent, or Firm* — Leydig, Voit & Mayer, Ltd.

(57) ABSTRACT

An image display system is provided and includes: at least one first projection unit, configured to project rays of N images on a first plane, so that the rays of the N images are projected on N first regions of the first plane, where the N images are images of a target object photographed based on N angles, and N≥2; and at least one first refraction unit, configured on the first plane, and configured to perform refraction processing on the rays of the images projected on the first regions, so that the rays of the N images are collected on a common display region. In this way, presentation of a three-dimensional image can adapt to a human eye viewing habit.

14 Claims, 6 Drawing Sheets

(56) References Cited

U.S. PATENT DOCUMENTS

| | | | |
|---|---|---|---|
| 2003/0067421 A1* | 4/2003 | Sullivan | G02B 30/52 345/6 |
| 2005/0180007 A1 | 8/2005 | Cossairt et al. | |
| 2010/0014053 A1 | 1/2010 | Brentnall, III et al. | |
| 2010/0103333 A1 | 4/2010 | Chang et al. | |
| 2011/0149046 A1 | 6/2011 | Chang | |
| 2011/0211256 A1* | 9/2011 | Connor | G09G 3/3473 359/463 |
| 2015/0245014 A1 | 8/2015 | Guo et al. | |

FOREIGN PATENT DOCUMENTS

| | | |
|---|---|---|
| CN | 102346367 A | 2/2012 |
| CN | 103048869 A | 4/2013 |
| CN | 104503094 A | 4/2015 |
| EP | 1510857 A1 | 3/2005 |
| JP | 2008064950 A | 3/2008 |
| WO | 9202845 A1 | 2/1992 |

\* cited by examiner

Common display region

Configuration region of a first refraction unit and a first projection unit

Viewing region

IMAGE DISPLAY SYSTEM

CROSS-REFERENCE TO RELATED APPLICATIONS

This application is a continuation of International Application No. PCT/CN2017/114162, filed on Dec. 1, 2017, which claims priority to Chinese Patent Application No. 201710138748.1 filed on Mar. 9, 2017, both of which are hereby incorporated by reference in their entireties.

TECHNICAL FIELD

This application relates to the field of image processing, and more specifically, to an image display system.

BACKGROUND

In a conventional image presentation manner, presentation means are a static planar picture means and a dynamic video means. A static picture can provide only an image about an angle of a scene, and even if the static picture is captured by using a pantoscopic lens, the picture cannot effectively and comprehensively present the scene. Although the dynamic video can provide comprehensive understanding about the scene for a user, an angle of view of an image is still limited, and a viewing manner depends on a photographing manner of a photographer, and therefore, is limited.

With rapid development of science and technology, there are more categories of multimedia images (for example, a video or a picture), and can present more effects, and the foregoing conventional presentation manners cannot meet a requirement of a user for a presentation manner.

In a next-generation novel display technology, three-dimensional stereoscopic display for completely presenting an object has become a development trend in the industry. Currently, a relatively mature three-dimensional display technology includes light-splitting stereoscopic display. To be specific, stereoscopic display is implemented based on a binocular parallax principle.

However, the light-splitting stereoscopic display uses a three-dimensional image constructed by manually producing parallax, causes a relatively high mental load to a viewer, is unsuitable for long-time viewing, and can hardly be widely applied.

It is expected to provide a technology for enabling presentation of a three-dimensional image to adapt to a human eye viewing habit.

SUMMARY

This application provides an image display system, so that presentation of a three-dimensional image can adapt to a human eye viewing habit.

An image display system in this application includes: at least one first projection unit, configured to project rays of N images on a first plane, so that the rays of the N images are projected on N first regions of the first plane, where the N images are images of target object photographed based on N angles, and N≥2; and at least one first refraction unit, configured on the first plane, and configured to perform refraction processing on the rays of the images projected on the first regions, so that the rays of the N images are collected on a common display region.

Optionally, the N first regions are in a one-to-one correspondence with the N images, and the N images are in a one-to-one correspondence with the N angles.

Optionally, the common display region is located on a second plane, and the second plane is parallel to or approximately parallel to the first plane.

Optionally, a range of the common display region is less than a preset range threshold, and the range threshold is determined based on a range of the images presented by the first projection unit.

Optionally, the range of the common display region is less than or equal to a range of a display region of a display unit included in the first projection unit, and the display unit is configured to display an image.

According to the image display system in this application, the images of the same target object at N different angles are obtained, and the N images are projected on the common display region by using the first refraction unit, so that a viewer can view, on the common display region, the images of the target object at different angles, to implement multi-angle presentation of the target object and implement presentation of a three-dimensional image. Because no light-splitting stereoscopic display manner is used, the presentation of the three-dimensional image can adapt to a human eye viewing habit.

Optionally, there are N first refraction units, the N first refraction units are in a one-to-one correspondence with the N first regions, a first refraction unit i is configured on a first region i, the first refraction unit i is configured to refract and then emit a ray of an image i that comes from the first region i, the image i is corresponding to the first region i, and i∈[1, N].

Optionally, angles by which the N first refraction units refract the rays are the same, or refraction angles of refraction processing performed by the N first refraction units are the same, or differences between incident angles and emergent angles of the N first refraction units are the same, or included angles between incident rays and emergent rays of the N first refraction units are the same.

According to the image display system in this application, the N first refraction units are located on a same plane or are approximately located on a same plane, so that the angles by which the N first refraction units refract the rays can be the same, thereby facilitating manufacturing of the image display system in this application, and improving practicability of the image display system in this application.

Optionally, there is one first refraction unit.

Optionally, there are N first projection units, and a first projection unit i in the N first projection units includes a display unit, and the display unit of the first projection unit i is configured to present (or display) the image i in the N images, where i∈[1, N].

Optionally, the first projection unit i in the N first projection units includes a zoom unit, and the zoom unit included in the first projection unit i is configured to zoom in or zoom out the image i presented by the display unit of the first projection unit i, where i∈[1, N].

Optionally, the first projection units are specifically configured to project the rays towards a first direction, and the first direction is perpendicular to or approximately perpendicular to the first plane.

Optionally, optical axes of the first refraction units intersect at a position O, or optical axes of the first projection units changed by the first refraction units intersect at a position O.

Optionally, the N first refraction units are configured on a first arc-shaped region of the first plane, and a projection of the intersection position O on the first plane is located at a center of a circle of the first arc-shaped region.

According to the image display system in this application, N display units (for example, displays) present the images of the same target object at the N different angles, and the first refraction units are set to collect the rays of the images on the common display region, so that the viewer can view, on the common display region, the images of the target object at the N angles, and there is no need to configure an extra display component such as a projection screen on the common display region. In addition, the first refraction units are set, so that directions towards which the N display units project the rays of the images can be parallel or approximately parallel, or orientations of display surfaces of the N display units can be consistent, thereby facilitating manufacturing of the image display system in this application, and improving practicability of the image display system in this application.

Optionally, a distance d between the first refraction unit i and the display unit of the first projection unit i is determined based on a distance $L_2$ between the first refraction unit i and the zoom unit of the first projection unit i, a focal length f of the zoom unit of the first projection unit i, and a distance $L_1$ between the intersection position O and the first refraction unit i, the first refraction unit i is configured on the first region i, the first refraction unit i is configured to refract and then emit the ray of the image i that comes from the first region i, the image i is corresponding to the first region i, the first projection unit i is configured to project the ray of the image i, and i □[1, N].

Optionally, there is one first projection unit, and the first projection unit is configured to project the N images in N time periods, where the N time periods are in a one-to-one correspondence with the N images; the display unit is specifically configured to present the image i in the N images in a time period i, where i□[1, N]; and the first projection unit further includes a scanning unit, configured to: receive the ray of the image i in the time period i, and project the ray of the image i on the first region i.

Optionally, the scanning unit includes an optical path change unit and a rotary reflection unit, where the optical path change unit is configured to: receive, in the time period i, the ray of the image i emitted by the zoom unit, and project the ray of the image i to the rotary reflection unit; and the rotary reflection unit is configured to project the ray of the image i on the first region i in the time period i.

Optionally, the zoom unit is a lens, and a size of the rotary reflection unit is determined based on a distance between the rotary reflection unit and the zoom unit in a direction of a main optical axis of the lens.

According to the image display system in this application, one display unit (for example, a display) presents, in the N time periods, the images of the same target object at the N different angles, and the first refraction unit is set to collect the rays of the images on the common display region, so that the viewer can view, on the common display region, the images of the target object at the N angles, and there is no need to configure an extra display component such as a projection screen on the common display region. In addition, when the zoom unit (for example, the lens) is configured to zoom in or zoom out the images at the N angles, the distance between the rotary reflection unit and the zoom unit in the direction of the main optical axis of the lens is reduced, so that the size of the rotary reflection unit can be reduced, thereby facilitating manufacturing of the image display system in this application, reducing configuration space of the image display system in this application, and improving practicability of the image display system in this application.

Optionally, the image display system further includes: at least one second projection unit, configured to project rays of M images on a third plane, so that the rays of the M images are projected on M second regions of the third plane, the M images are images of the target object photographed based on M angles, the M second regions are in a one-to-one correspondence with the M images, the M images are in a one-to-one correspondence with the M angles, M≥2, an axial center of the second arc-shaped region is the same as an axial center of the first arc-shaped region, and the third plane is parallel to the first plane; and at least one second refraction unit, configured on the third plane, and configured to perform refraction processing on the rays of the images projected on the second regions, so that the rays of the M images are projected and collected on the common display region.

Optionally, optical axes of the first refraction units intersect at the position O, or optical axes of the first projection units changed by the first refraction units intersect at the position O, and optical axes of the second refraction units intersect at the position O, or optical axes of the second projection units changed by the second refraction units intersect at the position O.

Optionally, the first plane is the same as the third plane, a refraction angle φ of refraction processing performed by the second refraction unit is determined based on the refraction angle θ of refraction processing performed by the first refraction unit, a radius $R_1$ of the first annular region, a radius $R_2$ of the second annular region, and a distance D between the intersection position O and the first plane.

According to the image display system in this application, the second projection unit is set, the second projection unit projects the M images of the target object on the second regions located an inner side or an outer side of the first regions, and the second refraction unit collects the rays of the M images on the common display region, so that an angle of view (for example, a perpendicular angle of view) can be enlarged, user experience can be improved, and practicability of the image display system in this application can be improved.

Optionally, the distance $L_1$ between the intersection position O and the first regions, the distance $L_2$ between the first plane and the display unit of the first projection unit, a distance $L_3$ between the intersection position O and the second regions, and a distance $L_4$ between the third plane and a display unit of the second projection unit meet: $L_1+L_2=L_3+L_4$.

Therefore, images formed by the first projection unit and the first refraction unit and images formed by the second projection unit and the second refraction unit can have a same zoom-in (or zoom-out) ratio.

DESCRIPTION OF EMBODIMENTS

The following describes technical solutions of this application with reference to accompanying drawings.

Figure 1:
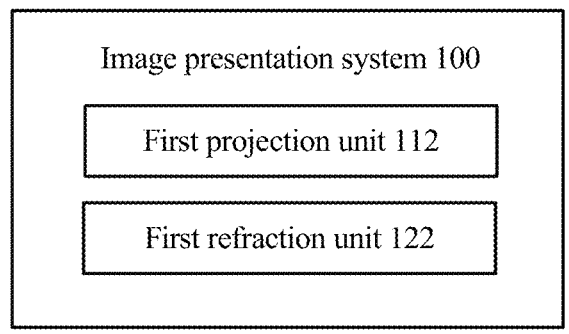
FIG. 1 is a schematic structural diagram of an image display system according to an embodiment of the present invention.

FIG. 1 is a schematic structural diagram of an image display system 100 according to an embodiment of the present invention. As shown in FIG. 1, the image display system 100 includes:

at least one first projection unit 112, configured to project rays of N images on a first plane, so that the rays of the N images are projected on N first regions of a first arc-shaped region of the first plane, where the N images are images of target object photographed based on N angles, the N first regions are in a one-to-one correspondence with the N images, the N images are in a one-to-one correspondence with the N angles, and N≥2; and a first refraction unit 122, configured on the first plane, and configured to perform refraction processing on the rays of the images projected on the first regions, so that the rays of the N images are projected and collected on a common display region of a second plane.

The following describes functions of components (or modules) included in the image display system 100 in this embodiment of the present invention.

In this embodiment of the present invention, the at least one first projection unit 112 is configured to present the images of the target object at the N angles (namely, an example of the N images).

By way of example rather than limitation, in this embodiment of the present invention, the images at the N angles may come from, for example, a 360-degree image of the target object (or an object). Alternatively, in this embodiment of the present invention, a 360-degree image of the target object may be decomposed into the images at the N angles, so that a 360-degree omnidirectional image of the target object can be formed by seamlessly splicing the images at the N angles.

For example, an image i in the N images may be an image of the target object photographed in a direction of an angle (or an angle of view) i, and i∈[1, N].

It should be understood that the foregoing specific source of the images at the N angles is merely an example for description, and this embodiment of the present invention is not limited thereto. For example, the images at the N angles may come from an image of another quantity of degrees of the target scenery.

In this embodiment of the present invention, the at least one first projection unit 112 is further configured to project the images at the N angles on a configuration plane (namely, an example of the first plane) of the at least one first refraction unit 122. Specifically, the at least one first projection unit 112 is specifically configured to project the images at the N angles on the N first regions of the first plane.

In this embodiment of the present invention, the N first regions may be annularly distributed, or the N first regions may be distributed on the first annular region.

In addition, in this embodiment of the present invention, the at least one first refraction unit 122 is configured to change optical paths of (for example, refraction) the rays (namely, the rays of the images at the N angles) incident on the N first regions, so that the refracted rays of the images at the N angles are collected on the common display region. Therefore, the N images finally form an X-degree image (for example, a 360-degree image) of the target object on the common display region. Therefore, when observing the common display region from different angles, a viewer can observe the images at the N angles, thereby implementing multi-angle presentation of the target scenery.

The following describes a configuration structure of the image display system 100 in this embodiment of the present invention.

In this embodiment of the present invention, there may be N first projection units 112, and each first projection unit 112 may include a display unit 114, so that the N first projection units 112 can present the images of the target object at the N angles at the same time (namely, a structure 1). Alternatively, there may be one first projection unit 112, the first projection unit 112 may include a display unit 114, and the display unit 114 can display different images in different time periods, so that the first projection unit 112 can present the images of the target object at the N angles in N time periods (namely, a structure 2). The following separately describes in detail the foregoing two structures.

Structure 1

Optionally, there are N first refraction units, a first refraction unit i is configured on a first region i, the first refraction unit i is configured to perform refraction processing on a ray of the image i projected on the first region i, and i∈[1, N].

Figure 3:
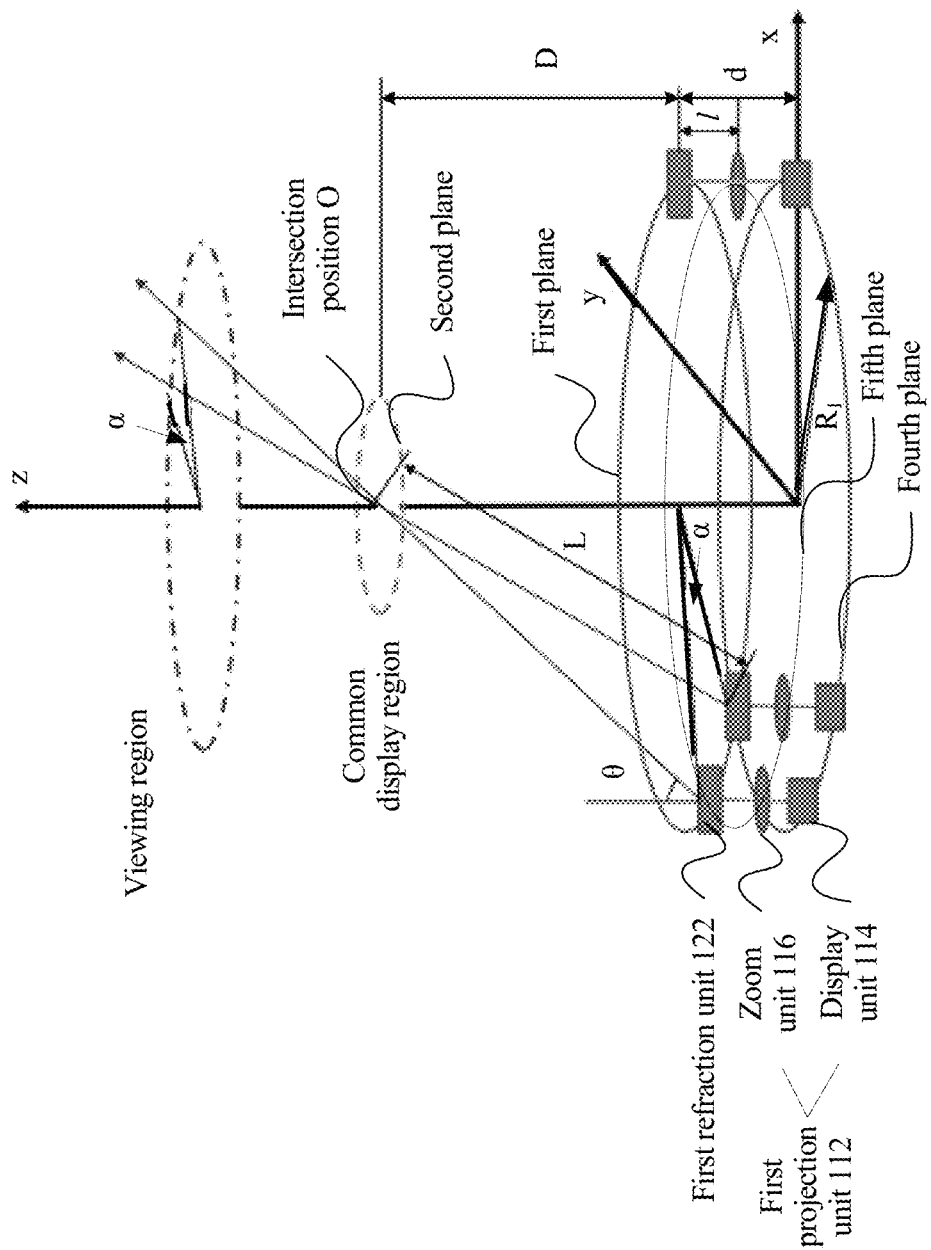
FIG. 3 is a schematic stereoscopic diagram of an example of an image display system according to an embodiment of the present invention.

FIG. 3 is a schematic stereoscopic diagram of an example of the image display system 100 according to an embodiment of the present invention. As shown in FIG. 3, the image display system 100 may include N first projection units 112, and each first projection unit 112 includes one display unit 114. In other words, in this embodiment of the present invention, the image display system 100 may include N display units 114.

It should be noted that in this embodiment of the present invention, the "display unit" may be alternatively referred to as a cell. In addition, by way of example rather than limitation, in this embodiment of the present invention, a display or a display screen may be used as the display unit 114.

In addition, in this embodiment of the present invention, assuming that the image display system 100 needs to present an X-degree image (for example, a 360-degree image) of the target scenery, and a sampling spacing between angles of view is α degrees, a relationship between the quantity N of display units 114 (or first projection units 112) needed for forming the X-degree image and α may be expressed as:

$$N = \frac{X}{\alpha}.$$

In other words, in this embodiment of the present invention, the N images presented by the N display units 114 can be spliced (for example, spliced seamlessly) to form the X-degree image (for example, the 360-degree image) of the target scenery.

By way of example rather than limitation, in this embodiment of the present invention, the N display units 114 may be configured on a fourth plane. In addition, by way of example rather than limitation, the fourth plane may be a plane parallel to a horizontal plane (or a plane perpendicular to a gravity direction).

It should be noted that the foregoing configuration manner of the N display units 114 is merely an example for description, and this embodiment of the present invention is not limited thereto. For example, the N display units 114 may be configured on different planes, and the planes on which the display units 114 are configured may be parallel or may not be parallel, and this is not specially limited in this embodiment of the present invention.

By way of example rather than limitation, in this embodiment of the present invention, each display unit 114 is placed with a display surface facing a first direction, or each display unit 114 may project a ray towards a first direction. In addition, by way of example rather than limitation, the first direction may be a straight up direction (or a direction opposite to the gravity direction). In other words, in this embodiment of the present invention, extension directions of optical axes of the display units 114 may be the first direction before being changed by the first refraction units 122.

It should be noted that the foregoing orientation of the display surfaces of the N display units 114 is merely an example for description, and this embodiment of the present invention is not limited thereto. For example, the N display units 114 may be configured to face different directions, and this is not specially limited in this embodiment of the present invention.

In addition, in this embodiment of the present invention, the N display units 114 may be arranged into an X-degree arc (for example, a 360-degree arc). It should be noted that when X=360, the N display units 114 may be specifically configured on a ring-shaped region of the fourth plane.

It should be noted that the foregoing arrangement manner of the N display units 114 is merely an example for description, and this embodiment of the present invention is not limited thereto. For example, the N display units 114 may be arranged into any shape provided that the N images can be collected on the common display region by using the refraction units, and this is not specially limited in this embodiment of the present invention.

For ease of understanding and description, in the following description, a straight line that passes through a center of the arc (a center of a circle of the arc) and that is perpendicular to the fourth plane is referred to as an axis of the image display system 100.

Figure 2:
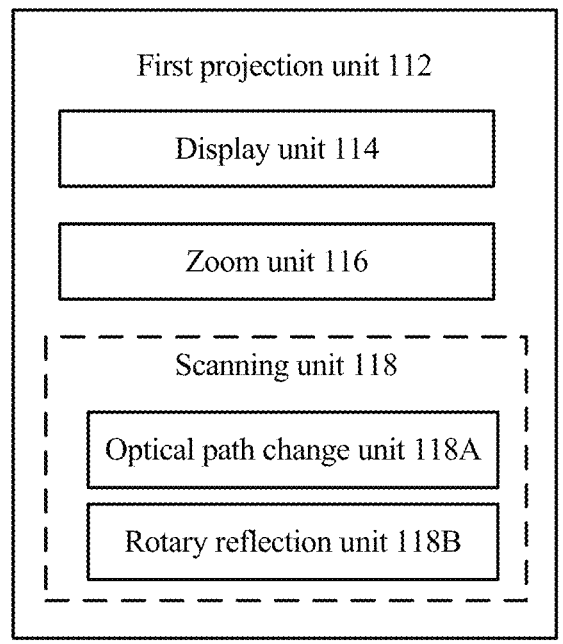
FIG. 2 is a schematic structural diagram of a first projection unit according to an embodiment of the present invention.

By way of example rather than limitation, in this embodiment of the present invention, as shown in FIG. 2, each first projection unit 112 includes one zoom unit 116. In other words, in this embodiment of the present invention, the image display system 100 may include N zoom units 116.

It should be noted that in this embodiment of the present invention, the "zoom unit" may be alternatively referred to as a projection lens. In addition, by way of example rather than limitation, in this embodiment of the present invention, a lens may be used as the zoom unit 116.

The N zoom units 116 are in a one-to-one correspondence with the N display units 114, and each zoom unit 116 is configured to zoom in or zoom out an image displayed by a corresponding display unit 114.

In other words, if zoom unit 116_i is corresponding to a display unit 114_i, and the display unit 114_i is configured to present the image i, where i ∈[1, N], the zoom unit 116_i is configured to zoom in or zoom out the image i.

By way of example rather than limitation, in this embodiment of the present invention, the N zoom units 116 may be configured on a fifth plane, and the fifth plane may be a plane parallel to the horizontal plane (or a plane perpendicular to the gravity direction). In other words, the fifth plane is parallel to or approximately parallel to the fourth plane.

It should be noted that the foregoing configuration manner of the N zoom units 116 is merely an example for description, and this embodiment of the present invention is not limited thereto. For example, the N zoom units 116 may be configured on different planes, and the planes on which the N zoom units 116 are configured may be parallel or may not be parallel, and this is not specially limited in this embodiment of the present invention.

By way of example rather than limitation, in this embodiment of the present invention, each zoom unit 116 may be located exactly above each corresponding display unit 114. Therefore, the N zoom units 116 may be arranged into an X-degree arc (for example, a 360-degree arc). It should be noted that when X=360, the N zoom units 116 may be specifically configured on a ring-shaped region of the fifth plane.

In other words, by way of example rather than limitation, in this embodiment of the present invention, the ray of the image i presented by the display unit 114_i may be projected straight upwards, and is projected on the zoom unit 116_i, so that the image i is zoomed in or zoomed out by the zoom unit 116_i. In addition, the zoom unit 116_i emits, towards a second direction, a ray of an image i that is zoomed in or zoomed out. By way of example rather than limitation, the second direction may be parallel to or approximately parallel to the first direction.

In other words, in this embodiment of the present invention, an extension direction of an optical axis of the zoom unit 116_i may be the same as an extension direction of an optical axis of the display unit 114_i, and extension directions of optical axes of the zoom units 116 may be the first direction before being changed by the first refraction units 122.

It should be noted that the foregoing configuration position of the zoom unit 116_i relative to the display unit 114_i is merely an example for description, and this embodiment of the present invention is not limited thereto. A configuration position of the display unit 114_i may be adjusted based on an orientation of a display surface of the zoom unit 116_i. For example, the zoom unit 116_i may be located at a downstream position of the display unit 114_i in a projection direction of the ray of the image i.

The first refraction units 122 are configured on the first plane above the first projection units 112 (specifically, above the zoom units 116).

In addition, in this embodiment of the present invention, the at least one first refraction unit may be alternatively referred to as an "imaging and splicing system".

By way of example rather than limitation, in this embodiment of the present invention, as shown in FIG. 3, there may be N first refraction units 122.

It should be noted that in this embodiment of the present invention, the "refraction unit" may be alternatively referred to as a light direction turning element (LDTE). In addition, by way of example rather than limitation, in this embodiment of the present invention, a prism may be used as the first refraction unit 122.

The N first refraction units 122 are in a one-to-one correspondence with the N first projection units 112 (including the N display units 114 and the N zoom units 116), and each first refraction unit 122 is configured to refract (or change an optical path of) a ray of an image projected by a corresponding first projection unit 112.

In other words, if the first refraction unit 122_i is corresponding to a first projection unit 112_i (or the display unit 114_i or the zoom unit 116_i), the first projection unit 112_i is configured to present the image i and project the ray of the image i, and i□[1, N], the first refraction unit 122_i is configured to refract the ray of the image i.

In addition, the first refraction unit 122_i is specifically configured to refract the ray of the image i, so that the ray of the image i is projected on the common display region of the second plane. In other words, in this embodiment of the present invention, the rays of the N images projected by the first refraction units 122 are collected on the common display region.

In this embodiment of the present invention, the common display region may be a region on which the N images are spliced into an image. In other words, in this embodiment of the present invention, a range of the common display region is less than or equal to a preset range threshold, so that the rays of the images refracted by the first refraction units 122 can be collected, and the images can be spliced into an image. The preset range threshold may be determined based on a range of display regions of the display units. For example, the preset range threshold may be equal to the range of the display regions. In other words, in this embodiment of the present invention, the range of the common display region may be less than or equal to the range of the display regions of the display units.

The second plane may be a plane parallel to the horizontal plane (or a plane perpendicular to the gravity direction). In other words, the second plane is parallel to or approximately parallel to the fourth plane.

By way of example rather than limitation, as shown in FIG. 3, the first refraction unit 122_i is specifically configured to refract the ray of the image i, so that the ray of the image i is projected at an intersection position O on the common display region. In other words, in this embodiment of the present invention, the rays of the N images projected by the first refraction units 122 are collected on the common display region.

In addition, in this embodiment of the present invention, optical axes of the first refraction units 122 may intersect at the intersection position O in space. In other words, the intersection position O may be a position of an intersection of the axes and the second plane. Alternatively, in this embodiment of the present invention, the rays of the N images projected by the first refraction units 122 are collected at a same position on the axes.

In other words, in this embodiment of the present invention, the extension direction of the optical axis of the zoom unit 116_i (or the optical axis of the display unit 114_i) may be the same as an extension direction of an optical axis of the first refraction unit 122_i after being changed by the first refraction unit 122_i, and the optical axes of the zoom units 116 (or the optical axes of the display unit 114_i) may intersect at the intersection position O in space after being changed by the first refraction units 122.

By way of example rather than limitation, in this embodiment of the present invention, the N first refraction units 122 may be configured on the first plane, and the first plane may be a plane parallel to the horizontal plane (or a plane perpendicular to the gravity direction). In other words, the first plane is parallel to or approximately parallel to the fourth plane.

It should be noted that the foregoing configuration manner of the N first refraction units 122 is merely an example for description, and this embodiment of the present invention is not limited thereto. For example, the N first refraction units 122 may be configured on different planes, and the planes on which the N first refraction units 122 are configured may be parallel or may not be parallel, and this is not specially limited in this embodiment of the present invention provided that the rays of the N images can be collected on the common display region.

By way of example rather than limitation, in this embodiment of the present invention, each first refraction unit 122 may be located exactly above a corresponding first projection unit 112 (or above a corresponding display unit 114 or a corresponding zoom unit 116). Therefore, the N first refraction units 122 may be arranged into an X-degree arc (for example, a 360-degree arc). It should be noted that when X=360, the N first refraction units 122 may be specifically configured on a ring-shaped region of the first plane.

In other words, by way of example rather than limitation, in this embodiment of the present invention, the ray of the image i presented by the display unit 114_i may be projected straight upwards, and is projected on the zoom unit 116_i, so that the image i is zoomed in or zoomed out by the zoom unit 116_i. In addition, the zoom unit 116_i projects, on the first refraction unit 122_i, a ray of an image i that is zoomed in or zoomed out. The first refraction unit 122_i refracts the ray and then projects the image on the common display region (for example, the intersection position O) of the second plane.

It should be noted that the foregoing configuration position of the first refraction unit 122_i relative to the display unit 114_i (or the zoom unit 116_i) is merely an example for description, and the present invention is not limited thereto. A configuration position of the first refraction unit 122_i may be adjusted based on the orientation of the display surface of the zoom unit 116_i. For example, the first refraction unit 122_i may be located at a downstream position of the display unit 114_i and the zoom unit 116_i in the projection direction of the ray of the image i.

In addition, in this embodiment of the present invention, angles by which the N first refraction units 122 refract the rays may be the same or may be different, and this is not limited in this embodiment of the present invention provided that the rays of the N images can be collected on the common display region.

For example, when the display units are configured on a same plane, the first ray refraction units are configured on a same plane, and the intersection position O is located on the axes, the angles by which the N first refraction units 122 refract the rays may be the same.

Figure 4:
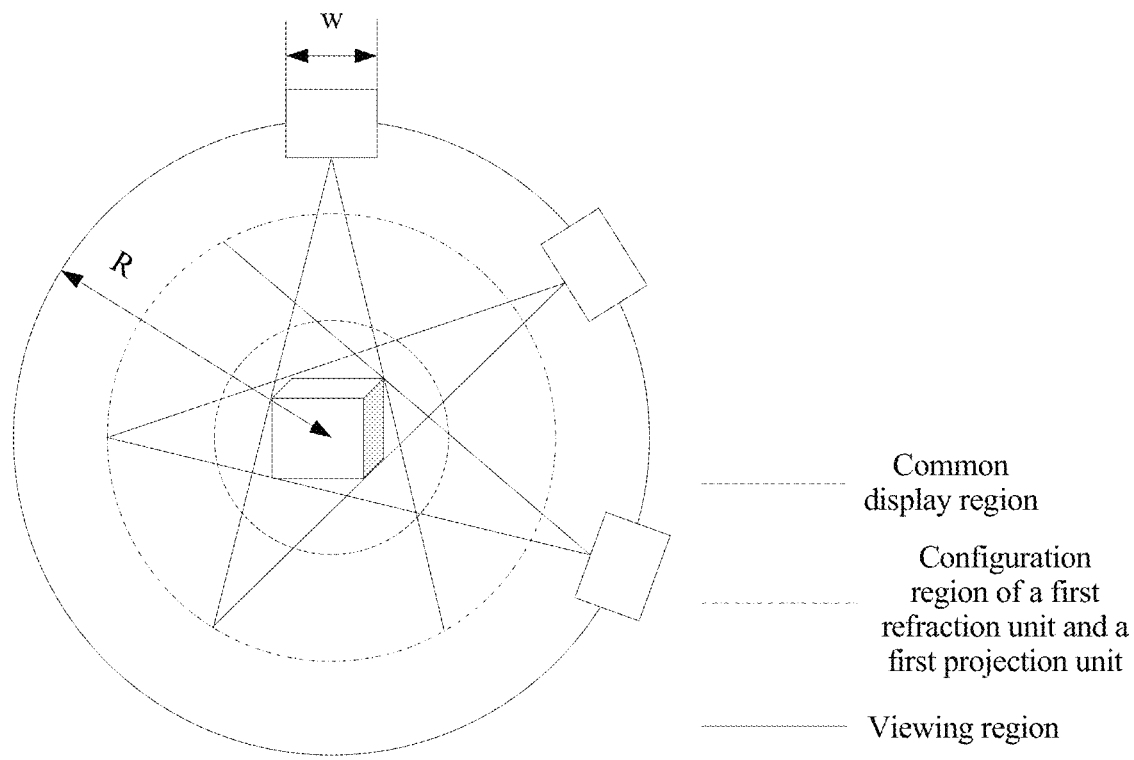
FIG. 4 is a schematic top view of an example of an image display system according to an embodiment of the present invention.

FIG. 4 is a schematic top view of an example of the image display system 100 according to an embodiment of the present invention. As shown in FIG. 4, the first projection units 112 and the first refraction units 122 are configured on an outermost annular region. The intersection position O located near the center is a region (namely, the common display region) on which the rays of the images refracted by the first refraction units 122 are collected.

As shown in FIG. 4, in this embodiment of the present invention, a length of the display unit 114 is w. In addition, N cells are needed to form the X-degree image (for example, the 360-degree image), where $$N = \frac{X}{\alpha}.$$

The N display units 114 presenting two-dimensional images are arranged into an arc on the fourth plane, the N zoom units 116 are arranged into an arc on the fifth plane, and the N first refraction units 122 are arranged into an arc on the first plane.

By way of example rather than limitation, for example, in this embodiment of the present invention, when the display surface of the display unit 114_i faces straight upwards, the zoom unit 116_i may be located exactly above the display unit 114_i, and the first refraction unit 122_i may be located exactly above the display unit 114_i.

A radius $R_1$ of the arc is:

$$R_1 = \frac{N \times w}{2\pi}.$$

It is assumed that a refraction angle of the first refraction unit 122_i is θ. In this embodiment of the present invention, the refraction angle may be a refraction angle of refraction processing performed by a refraction unit, or the refraction angle may be an included angle between an incident ray and an emergent ray of a refraction unit, or the refraction angle may be a difference between an incident angle and an emergent angle of a refraction unit.

By way of example rather than limitation, based on an observation habit of people, when a person sits or stands towards a table, an observation angle of view is generally 30 degrees to 60 degrees obliquely downwards. Therefore, when a display unit presents an image upwards, θ may be 30 to 60 degrees.

Figure 5:
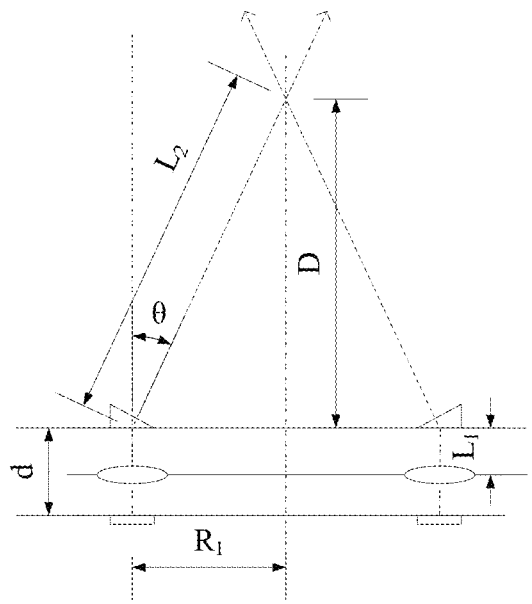
FIG. 5 is a schematic diagram of an optical path of an example of an image display system according to an embodiment of the present invention.

FIG. 5 is a schematic diagram of a position relationship between components of an example of the image display system according to an embodiment of the present invention. As shown in FIG. 5, a distance D between the common display region (namely, an imaging region, for example, the intersection position O) and the first plane (namely, the configuration plane of the N first refraction units 122) is:

$$D = \frac{R_1}{\tan(\theta)}.$$

In addition, a distance $L_2$ between the common display region (namely, the imaging region, for example, the intersection position O) and the first refraction unit 122_i is:

$$L_2 = \frac{R_1}{\sin(\theta)}.$$

It is assumed that a distance between the zoom unit 116_i and the first refraction unit 122_i is $L_1$, a distance between the display unit 114_i and the first refraction unit 122_i is d, an image distance (namely, a distance between a lens and an imaging position) of the zoom unit 116_i (for example, the lens) is F, an object distance (namely, a distance between a cell position and a lens) of the zoom unit 116_i (for example, the lens) is G, and a focal length of the zoom unit 116_i (for example, a lens) is f. In this embodiment of the present invention, G=d−$L_1$. Then, to form a clear image at the intersection position O, the following needs to be met:

$L_2+L_1=F.$

In addition, it can be learned based on a lens imaging principle that:

$$\frac{1}{f} = \frac{1}{G} + \frac{1}{F}.$$

Therefore, it can be deduced that:

$$d = L_2 + \frac{f(L_1 + L_2)}{L_1 + L_2 - f}.$$

According to the image presentation/display system 100 in this embodiment of the present invention, the N display units that present the images straight upwards and the refraction units are configured, so that an X-degree image of a target object can be presented on the common display region. In addition, the display units can be easily configured, so that the image presentation system 100 is easily assembled, and there is no need to configure a projection screen, thereby reducing manufacturing costs of the image presentation system 100 in this embodiment of the present invention, and improving practicability of the image presentation system 100 in this embodiment of the present invention.

It should be noted that in the image presentation system 100 described above, there are N first refraction unit 122. However, this embodiment of the present invention is not limited thereto. There may be alternatively one first refraction unit 122. The first refraction unit 122 can receive the rays of the N images projected by the N first projection units 112, and refract the rays of the N images, to form an image of the target object on the common display region. For example, a size of the first refraction unit 122 may be relatively large, to cover positions of the N first projection units 112, so that N parts of the first refraction unit 122 can respectively receive the rays of the N images projected by the N first projection units 112.

By way of example rather than limitation, in this embodiment of the present invention, the image presentation system 100 may further include:

at least one second projection unit 132, configured to project rays of M images on a third plane, so that the rays of the M images are projected on M second regions of a second ring-shaped region of the third plane, the M images are images of the target object photographed based on M angles, the M second regions are in a one-to-one correspondence with the M images, the M images are in a one-to-one correspondence with the M angles, M≥2, an axial center of the second ring-shaped region is the same as an axial center of the first ring-shaped region, and the third plane is parallel to the first plane; and at least one second refraction unit 142, configured on the third plane, and configured to refract and then emit the rays of the images that come from the second regions, so that the rays of the M images are projected and collected on the common display region.

In this embodiment of the present invention, the at least one second projection unit 132 is configured to present the images of the target object at the M angles (namely, an example of the M images). A value of M may be the same as a value of N, or values of M and N may be different, and this is not specially limited in this embodiment of the present invention.

By way of example rather than limitation, in this embodiment of the present invention, the images at the M angles may come from, for example, a 360-degree image of the target object (or an object). Alternatively, in this embodiment of the present invention, a 360-degree image of the target object may be decomposed into the images at the M angles, so that a 360-degree omnidirectional image of the target object can be formed by seamlessly splicing the images at the M angles.

For example, an image i in the M images may be an image of the target object photographed in a direction of an angle (or an angle of view) i, and i□[1, M].

It should be understood that the foregoing specific source of the images at the M angles is merely an example for description, and this embodiment of the present invention is not limited thereto. For example, the images at the M angles may come from an image of another quantity of degrees of the target scenery.

It should be noted that in this embodiment of the present invention, there may be one or more image groups in the M images and the N images, any image group includes one or more images in the M images and one or more images in the N images, and a plurality of images in any image group may be images having corresponding photographing angles, so that a parallax effect of a three-dimensional image can be generated when images projected from different arcs are observed at observation positions in different perpendicular directions.

In addition, configuration positions of display units presenting images in a same image group in the image presentation system 100 may be in a same configuration range. For example, radians (or circumferential phases) that are of two display units presenting two images in a same image group and that are on two arc-shaped regions may be the same or similar. For another example, radians (or circumferential phases) that are of two refraction units (including one first refraction unit and one second refraction unit) configured to refract rays of two images in a same image group and that are on two arc-shaped regions may be the same or similar.

In this embodiment of the present invention, the at least one second projection unit 132 is further configured to project the images at the M angles on a configuration plane (namely, an example of the third plane) of the at least one second refraction unit 142. Specifically, the at least one second projection unit 132 is specifically configured to project the images at the M angles on the M second regions of the third plane.

By way of example rather than limitation, in this embodiment of the present invention, the third plane and the first plane may be a same plane, or the third plane may be parallel to or approximately parallel to the first plane.

In this embodiment of the present invention, the M second regions may be annularly distributed, or the M second regions may be distributed on a second annular region.

In addition, by way of example rather than limitation, in this embodiment of the present invention, a center of the second annular region may be the same as a center of the first annular region, and a radius of the second annular region is different from a radius of the first annular region.

In addition, in this embodiment of the present invention, the at least one second refraction unit 142 is configured to change an optical path of (for example, refraction) the rays (namely, the rays of the images at the M angles) incident on the M second regions, so that the refracted rays of the images at the M angles are collected on the common display region. Therefore, the M images finally form an X-degree image (for example, a 360-degree image) of the target object on the common display region. Therefore, when observing the common display region from different angles, a viewer can observe the images at the M angles, thereby implementing multi-angle presentation of the target scenery. In addition, because the radius of the second annular region is different from the first annular region, a relatively large viewing range can be provided in a perpendicular direction.

By way of example rather than limitation, the image display system 100 may include M second projection units 132, and each second projection unit 132 includes one display unit 134. In other words, in this embodiment of the present invention, the image display system 100 may include M display units 134.

By way of example rather than limitation, in this embodiment of the present invention, a display or a display screen may be used as the display unit 134.

In addition, in this embodiment of the present invention, assuming that the image display system 100 needs to present an X-degree image (for example, a 360-degree image) of the target scenery, and a sampling spacing between angles of view is 13 degrees, a relationship between the quantity M of display units 134 (or second projection units 132) needed for forming the X-degree image and β may be expressed as:

$$M = \frac{X}{\beta}.$$

A value of β may be the same as or may be different from a value of α, and this is not specially limited in this embodiment of the present invention.

In other words, in this embodiment of the present invention, the M images presented by the M display units 134 can be spliced (for example, spliced seamlessly) to form the X-degree image (for example, the 360-degree image) of the target scenery.

By way of example rather than limitation, in this embodiment of the present invention, the M display units 134 may be configured on the fourth plane.

It should be noted that the foregoing configuration manner of the M display units 134 is merely an example for description, and this embodiment of the present invention is not limited thereto. For example, the M display units 134 may not be configured on the fourth plane, or the M display units 134 may be configured on different planes, and the planes on which the M display units 134 are configured may be parallel or may not be parallel, and this is not specially limited in this embodiment of the present invention.

By way of example rather than limitation, in this embodiment of the present invention, each display unit 134 is placed with a display surface facing the first direction, or each display unit 134 may project a ray towards the first direction.

In other words, in this embodiment of the present invention, extension directions of optical axes of the display units 134 may be the first direction before being changed by the second refraction unit 142.

It should be noted that the foregoing orientation of the display surfaces of the M display units 134 is merely an example for description, and this embodiment of the present invention is not limited thereto. For example, the M display units 134 may be configured to face different directions, and this is not specially limited in this embodiment of the present invention.

In addition, in this embodiment of the present invention, the M display units 134 may be arranged into an X-degree arc (for example, a 360-degree arc). It should be noted that when X=360, the M display units 134 may be specifically configured on a ring-shaped region of the fourth plane. In other words, the ring-shaped region for configuring the M display units 134 and the ring-shaped region for configuring the N display units 114 may be concentric circles having different radiuses.

It should be noted that the foregoing arrangement manner of the M display units 134 is merely an example for description, and this embodiment of the present invention is not limited thereto. For example, the M display units 134 may be arranged into any shape provided that the M images can be collected on the common display region by using the ray refraction units, and this is not specially limited in this embodiment of the present invention.

By way of example rather than limitation, in this embodiment of the present invention, each second projection unit 132 includes one zoom unit 136. In other words, in this embodiment of the present invention, the image display system 100 may include M zoom units 136.

In addition, by way of example rather than limitation, in this embodiment of the present invention, a lens may be used as the zoom unit 136.

The M zoom units 136 are in a one-to-one correspondence with the M display units 134, and each zoom unit 136 is configured to zoom in or zoom out an image displayed by a corresponding display unit 134.

In other words, if the zoom unit 136_j is corresponding to a display unit 134_j, and the display unit 134_j is configured to present the image j, where j □[1, M], the zoom unit 136_j is configured to zoom in or zoom out the image j.

By way of example rather than limitation, in this embodiment of the present invention, the M zoom units 136 may be configured on the fifth plane.

It should be noted that the foregoing configuration manner of the M zoom units 136 is merely an example for description, and this embodiment of the present invention is not limited thereto. For example, the M zoom units 136 may be configured on different planes, and the planes on which the M zoom units 136 are configured may be parallel or may not be parallel, and this is not specially limited in this embodiment of the present invention.

By way of example rather than limitation, in this embodiment of the present invention, each zoom unit 136 may be located exactly above each corresponding display unit 134. Therefore, the M zoom units 136 may be arranged into an X-degree arc (for example, a 360-degree arc). It should be noted that when X=360, the M zoom units 136 may be specifically configured on a ring-shaped region of the fifth plane.

In other words, by way of example rather than limitation, in this embodiment of the present invention, a ray of the image j presented by the display unit 134_j may be projected straight upwards, and is projected on the zoom unit 136_j, so that the image j is zoomed in or zoomed out by the zoom unit 136_j. In addition, the zoom unit 116_j emits, towards a second direction, a ray of an image j that is zoomed in or zoomed out. By way of example rather than limitation, the second direction may be parallel to or approximately parallel to the first direction.

In other words, in this embodiment of the present invention, an extension direction of an optical axis of the zoom unit 136_j may be the same as an extension direction of an optical axis of the display unit 134_j, and extension directions of optical axes of the zoom units 136 may be the first direction before being changed by the second refraction unit 142.

It should be noted that the foregoing configuration position of the zoom unit 136_j relative to the display unit 134_j is merely an example for description, and the present invention is not limited thereto. A configuration position of the display unit 134_j may be adjusted based on an orientation of a display surface of the zoom unit 136_j. For example, the zoom unit 136_j may be located at a downstream position of the display unit 134_j in a projection direction of the ray of the image j.

The at least one second refraction unit 142 is configured on the third plane (for example, a plane the same as the first plane) located above the second projection unit 132 (specifically, above the zoom unit 136).

In addition, in this embodiment of the present invention, the at least one second refraction unit 142 may be alternatively referred to as an "imaging and splicing system".

By way of example rather than limitation, in this embodiment of the present invention, there may be M second refraction units 142.

In addition, by way of example rather than limitation, in this embodiment of the present invention, a prism may be used as the second refraction unit 142.

The M second refraction units 142 are in a one-to-one correspondence with the M second projection units 132 (including the M display units 134 and the M zoom units 136), and each second refraction unit 142 is configured to refract (or change an optical path of) a ray of an image projected by a corresponding second projection unit 132.

In other words, if the second refraction unit 142_j is corresponding to a second projection unit 132_j (or the display unit 134_j or the zoom unit 136_j), the second projection unit 132_j is configured to present the image j and project the ray of the image j, and j 0[1, M], the second refraction unit 142_j is configured to refract the ray of the image j.

In addition, the second refraction unit 142_j is specifically configured to refract the ray of the image j, so that the ray of the image j is projected on the common display region of the second plane. In other words, in this embodiment of the present invention, the rays of the M images projected by the second refraction units 142 are collected on the common display region.

By way of example rather than limitation, the second refraction unit 142_j is specifically configured to refract the ray of the image j, so that the ray of the image j is collected on the common display region. In addition, optical axes of the second refraction units 142 intersect at the intersection position O. In other words, in this embodiment of the present invention, the rays of the M images projected by the M second projection units 132 are collected on the common display region.

In other words, in this embodiment of the present invention, the extension direction of the optical axis of the zoom unit 136j (or the optical axis of the display unit 134_j) may be the same as an extension direction of an optical axis of the second refraction unit 142_j after being changed by the second refraction unit 142_j, and the optical axes of the zoom units 136 (or the optical axes of the display units 134) may intersect at the intersection position O in space after being changed by the second refraction units 142.

By way of example rather than limitation, in this embodiment of the present invention, the M second refraction units 142 may be configured on the third plane, and the third plane may be a plane parallel to the horizontal plane (or a plane perpendicular to the gravity direction). In other words, the third plane is parallel to or approximately parallel to the fourth plane.

In addition, the third plane and the first plane may be a same plane, or the third plane and the first plane may be different planes, and this is not specially limited in this embodiment of the present invention.

It should be noted that the foregoing configuration manner of the M second refraction units 142 is merely an example for description, and this embodiment of the present invention is not limited thereto. For example, the M second refraction units 142 may be configured on different planes, and the planes on which the M second refraction units 142 are configured may be parallel or may not be parallel, and this is not specially limited in this embodiment of the present invention provided that the rays of the M images can be collected on the common display region.

By way of example rather than limitation, in this embodiment of the present invention, each second refraction unit 142 may be located exactly above a corresponding second projection unit 132 (or a corresponding display unit 134 or a corresponding zoom unit 136). Therefore, the M second refraction units 142 may be arranged into an X-degree arc (for example, a 360-degree arc). It should be noted that when X=360, the M second refraction units 142 may be specifically configured on a ring-shaped region of the third plane. In this embodiment of the present invention, the ring-shaped region for configuring the M second refraction units 142 and the ring-shaped region for configuring the N first refraction units 122 may be concentric circles having different radiuses.

In other words, by way of example rather than limitation, in this embodiment of the present invention, the ray of the image j presented by the display unit 134_j may be projected straight upwards, and is projected on the zoom unit 136_j, so that the image j is zoomed in or zoomed out by the zoom unit 136_i. In addition, the zoom unit 136_i projects, on the second refraction unit 142_j, the ray of the image j that is zoomed in or zoomed out. The second refraction unit 142_j refracts the ray and then projects the ray on the common display region (for example, the intersection position O) of the second plane.

It should be noted that the foregoing configuration position of the second refraction unit 136j relative to the display unit 134j (or the zoom unit 136j) is merely an example for description, and this embodiment of the present invention is not limited thereto. A configuration position of the second refraction unit 142_j may be adjusted based on the orientation of the display surface of the zoom unit 136_j. For example, the second refraction unit 142_j may be located at a downstream position of the display unit 134_j and the zoom unit 116_j in the projection direction of the ray of the image j.

In addition, in this embodiment of the present invention, angles by which the M second refraction units 142 refract the rays may be the same or may be different, and this is not limited in this embodiment of the present invention provided that the rays of the M images can be collected on the common display region.

For example, when the display units are configured on a same plane, the second ray refraction units are configured on a same plane, and the intersection position O is located on the axes, the angles by which the M second refraction units 142 refract the rays may be the same.

In this embodiment of the present invention, the N first projection units 112 (including the N display units 114 and the N zoom units 116) and the M second projection units 132 (including the M display units 134 and the M zoom units 136) may be arranged into arcs (or annular structures) having different radiuses in a form of concentric circles. In addition, the N first refraction units 122 and the M second refraction units 142 may be arranged into arcs (or annular structures) having different circles in a form of concentric circles.

Figure 6:
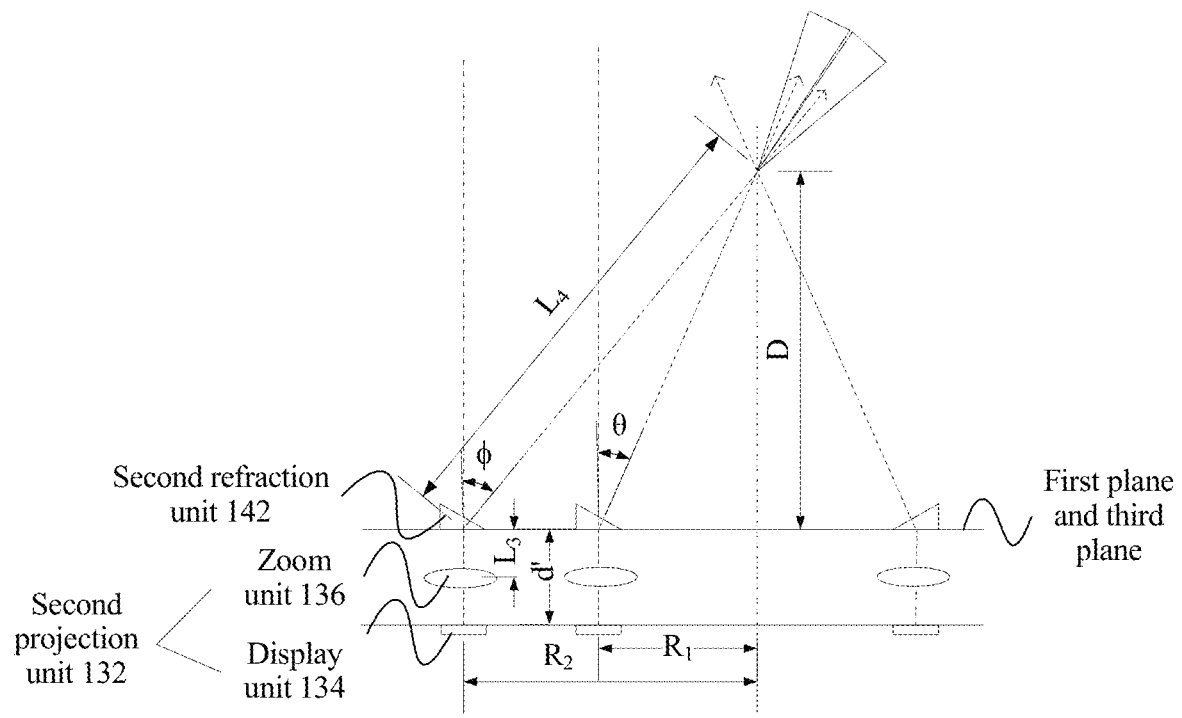
FIG. 6 is a schematic diagram of an optical path of another example of an image display system according to an embodiment of the present invention.

FIG. 6 is a schematic diagram of a position relationship between components of another example of the image display system according to an embodiment of the present invention. As shown in FIG. 6, it is assumed that a radius of the arc formed by the N first projection units 112 is $R_1$, and a radius of the arc formed by the M second projection units 132 is $R_2$. $R_2 = R_1 + h$ when no splicing gap is considered, where h is a length of the display unit in the splicing direction. Because the radius of the arc formed by the M second projection units 132 is increased, a quantity of display units included in the M second projection units 132 is increased to $2R_1 + h$, to reduce a horizontal parallax angle.

In order that an image formed by using the first projection units 112 and the first refraction units 122 and an image formed by using the second projection units 132 and the second refraction units 142 can mutually fit in a direction of a perpendicular angle of view, in this embodiment of the present invention, the refraction angle φ of the M second refraction units 142 may be:

$$\phi = \tan^{-1}\left(\frac{R_1 + h}{D}\right).$$

In addition, in this embodiment of the present invention, a sampling spacing between angles of view in the perpendicular angle of view is λ=φ−θ.

Therefore, a distance $L_3$ between the common display region (namely, the imaging region, for example, the intersection position O) and the second refraction unit 142_j may be represented as:

$$L_3 = \frac{D}{\cos(\phi)}.$$

Assuming that a distance between the zoom unit 136_j and the second refraction unit 142_j is $L_4$, a distance between the display unit 134_j and the first refraction unit 142_j is d', and a focal length of the zoom unit 136_j (for example, a lens) is f', the following needs to be met to form a clear image at the intersection position O:

$$d' = L_3 + \frac{f'(L_3 + L_4)}{L_3 + L_4 - f'}.$$

In addition, in order that the image formed by using the first projection units 112 and the first refraction units 122 and the image formed by using the second projection units 132 and the second refraction units 142 have a same zoom-in (zoom-out) ratio, in this embodiment of the present invention, $L_1$, $L_2$, $L_3$, and $L_4$ may meet the following relationship:

$$L_1 + L_2 = L_3 + L_4.$$

Due to a limitation of physical splicing of the display units 114, a splicing gap exists between the display units 114, and the gap causes discontinuity of images formed between angles of view. Therefore, in this embodiment of the present invention, the splicing gap between the display units 114 may be cancelled. For example, a method for cancelling a splicing gap by using a partial-reflection partial-transmission mirror may be used. Specifically, the display units 114 may be arranged into two groups of circular display unit arrays, and then the two groups of display unit arrays are alternately arranged on two sides of the partial-reflection partial-transmission mirror, to form a seamless light field in a light emergent direction of the partial-reflection partial-transmission mirror. An effect of the method is the same as that of seamlessly arranging the display units 114. A splicing gap in a perpendicular direction can also be cancelled by using this method.

In addition, a similar manner may be used to cancel a splicing gap between the display units 134.

It should be understood that the foregoing method of cancelling a splicing gap is merely an example for description, and this embodiment of the present invention is not limited thereto. Various methods for cancelling a splicing gap in the prior art may be applied to this embodiment of the present invention.

In this embodiment of the present invention, a size of a display unit may be selected based on an actual need.

Without loss of generality, it is assumed that 360 micro displays having a same display parameter are used as the display units 114, a size of each micro display is 12.8 mm×10.24 mm, and a pixel size is 10 μm. Display surfaces of the 360 micro displays face straight upwards and the 360 micro displays are spliced and placed based on an arc. It can be obtained based on the foregoing formula that a radius of the arc is $R_1$=733 mm.

A projection lens is placed behind each micro display and is used as the zoom unit 116, to zoom in a projection of an image generated by the micro display. In this example, a diameter of a used projection lens is 12.8 mm, and a focal length is 100 mm.

In this example, 360 prisms are used as the first refraction units 122, and are arranged into an arc-shaped array as the first refraction units 122 (namely, a 3D display screen), to control a projection direction of each projected image. The 360 prisms are in a one-to-one correspondence with the micro displays, and are arranged into an arc having a radius of 733 mm. Ray refraction directions point to a center of a circle, and intersect at the intersection position O that is exactly above the center of the arc by a distance D. A size of a single prism is 12.8 mm×12.8 mm, and a refraction angle is 45 degrees. It can be obtained based on the foregoing formula that the distance D is 733 mm and $L_1$ is 1038 mm. The prism is placed on a back focal plane of the projection lens. An image distance of the projected image is 1038 mm+100 mm=1138 mm, an object distance is 110 mm, a system zoom-in ratio is approximately 10 times, and a size of the common display region (or a display window) is 128 mm×102.4 mm.

Structure 2

The image presentation system 100 includes one first projection unit 112, the first projection unit 112 is configured to project the N images in N time periods, the N time periods are in a one-to-one correspondence with the N images, the display unit is specifically configured to present the image i in the N images in a time period i, and i□[1, N].

As shown in FIG. 2, the first projection unit 112 further includes a scanning unit 118, configured to: receive a ray of the image i in the time period i, and project the ray of the image i on a first region i.

Figure 7:
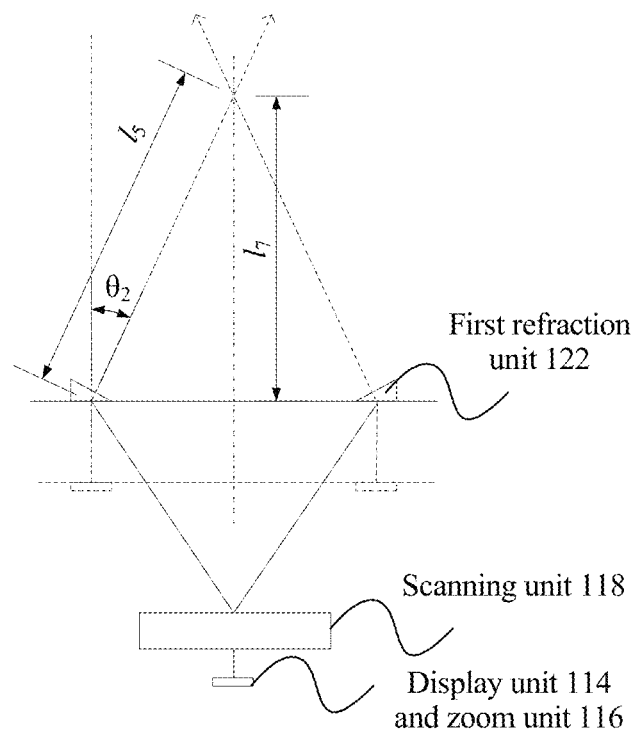
FIG. 7 is a schematic diagram of an optical path of still another example of an image display system according to an embodiment of the present invention.

FIG. 7 is a schematic diagram of an example of the image display system 100 according to an embodiment of the present invention. As shown in FIG. 7, the image display system 100 may include one first projection unit 112, and the first projection unit 112 includes one display unit 114. In other words, in this embodiment of the present invention, the image display system 100 may include one display unit 114.

In this embodiment of the present invention, the display unit 114 can present the N images in the N time periods.

In addition, in this embodiment of the present invention, assuming that the image display system 100 needs to present an X-degree image (for example, a 360-degree image) of the target scenery, and a sampling spacing between angles of view is a degrees, a relationship between N and a may be expressed as:

$$N = \frac{X}{\alpha}.$$

In other words, in this embodiment of the present invention, the N images presented by the display unit 114 in the N time periods can be spliced (for example, spliced seamlessly) to form the X-degree image (for example, the 360-degree image) of the target scenery.

By way of example rather than limitation, in this embodiment of the present invention, the display unit 114 may be a component having a sufficient frame_rate, for example, a digital micromirror device (DMD).

In addition, the scanning unit 118 may be used to project, at a plurality of positions, the images that are presented by the display unit 114 in different time periods, to achieve the objective of this solution by simulating cells at a plurality of positions by using a single display component. As shown in FIG. 7, an image projected by a DMD projection system (namely, the display unit 114 and the zoom unit 116) is projected at a particular position of the first refraction unit 122 after passing through the scanning system (namely, the scanning unit 118). The scanning system may be controlled, so that a scanning track of the scanning system on a polarization plane (or the configuration plane of the first refraction unit 122, namely, the first plane) forms a ring.

By way of example rather than limitation, in this embodiment of the present invention, a reflective rotary screen may be used as the screening unit 118. To be specific, because the DMD projects, in different time periods, images having different angles of view, and the reflective rotary screen has a fixed refraction angle structure, the image can be refracted to only a direction of one observation angle of view at a same moment; and images projected by the DMD at different moments can be refracted to directions of different observation angles of view through rotation of the screen.

In this embodiment of the present invention, parameters of the DMD projection system and the scanning system are controlled, so that an effect thereof is equivalent to an effect of placing an annular display unit array (including N display units) below the first refraction unit 122.

For example, in this embodiment of the present invention, the N images projected by the display unit 114 on the first plane may be arranged into an X-degree arc (for example, a 360-degree arc). It should be noted that when X=360, the N images projected by the display unit 114 on the first plane form a ring.

By way of example rather than limitation, in this embodiment of the present invention, the first projection unit 112 may further include one zoom unit 116. In other words, in this embodiment of the present invention, the image display system 100 may include one zoom unit 116.

It should be noted that in this embodiment of the present invention, the "zoom unit" may be alternatively referred to as a projection lens. In addition, by way of example rather than limitation, in this embodiment of the present invention, a lens may be used as the zoom unit 116.

The zoom unit 116_i is configured to zoom in or zoom out the images presented by the display unit 114.

In addition, a configuration manner of the first refraction unit 122 in structure 2 may be the same as the configuration manner in structure 1. To avoid repetition, detailed descriptions are omitted herein.

By way of example rather than limitation, as shown in FIG. 2, in this embodiment of the present invention, the scanning unit includes an optical path change unit 118A and a rotary reflection unit 118B.

The optical path change unit 118A is configured to: receive, in the time period i, a ray of an image i emitted by the zoom unit, and project the ray of the image i on the rotary reflection unit.

The rotary reflection unit 118B is configured to project the ray of the image i on the first region i in the time period i.

Figure 8:
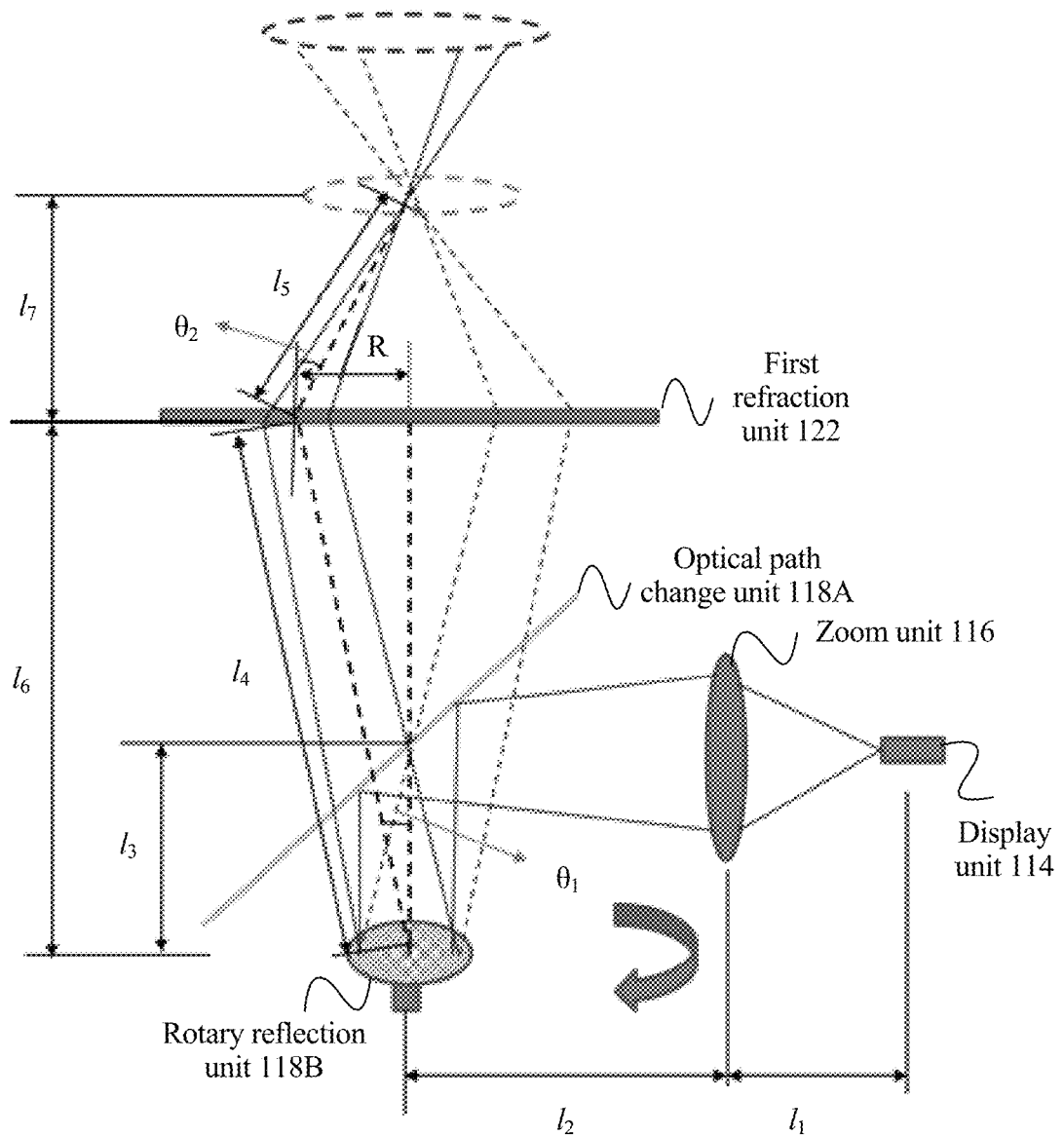
FIG. 8 is a schematic diagram of an optical path of still another example of an image display system according to an embodiment of the present invention.

Specifically, FIG. 8 is a schematic diagram of a position relationship between components of still another example of the image display system according to an embodiment of the present invention. As shown in FIG. 8, it is assumed that a size (or a size of the display unit 114) of an image presented by the display unit 114 is w×k, a size of an image zoomed in by the zoom unit 116 is W×H, and the N images presented by the display unit 114 in the N time periods need to form an X-degree image (for example, a 360-degree image) of the target scenery. Because the display unit 114 needs to generate N images, a special requirement is imposed on a refreshing frequency of the display unit 114, and the refreshing frequency Q of the display unit 114 needs to meet the following condition:

$Q = N \times color \times frame\_rate$, where color indicates three primary colors (namely, red, green, blue), and frame_rate indicates a display frame rate of a final three-dimensional image.

As described above, an image displayed by the display unit 114 (or an imaging component) is zoomed in and projected by the zoom unit 116 (for example, a projection lens) having a focal length of f, and the zoom unit 116 is configured in front of the display unit 114. The optical path change unit 118A (for example, a partial-reflection partial-transmission mirror) is configured in front of the zoom unit 116, to change a propagation direction of an optical path, and project the image on the rotary reflection unit 118B (for example, a reflective rotary screen).

It is assumed that a distance between the intersection position O (namely, a three-dimensional image forming position) and the first regions is $l_5$, a distance between the intersection position O and the first plane is $l_7$, a distance between the rotary reflection unit 118B and the first plane is $l_6$, a distance between a center of the optical path change unit 118A and the rotary reflection unit 118B is $l_3$, a distance between the rotary reflection unit 118B and the first regions is $l_4$, a distance between the center of the optical path change unit 118A and the zoom unit 116 is $l_2$, and a distance between the display unit 114 and the zoom unit 116 is $l_1$.

Then it may be obtained based on a lens imaging formula that a projection distance (namely, an image distance) of a cell is $l_2+l_3+l_4+l_5$, and all cells finally intersect at a position that is exactly above a center of the rotary screen by a distance $l_6+l_7$.

A refraction angle $\theta_1$ of the rotary screen separately meets the following relationships with $l_6$ and $l_4$:

$$l_6 = \frac{R_1}{\tan(\theta_1)}; \text{ and}$$

$$l_4 = \frac{R_1}{\sin(\theta_1)}.$$

$R_1$ in the foregoing formulas is a distance between the first regions arranged into a circle and a center of a circle, and meets $R_1 \geq W$.

In this embodiment of the present invention, a size s of the rotary screen may be obtained based on a geometrical relationship, that is:

$s = 2 \times l \times W/(l'+f)$, where $l = l_2 + l_3$, and $l' = l_2 + l_3 + l_4 + l_5$.

In addition, W is a size of a parallax image after zoom-in, and a rotary screen closer to the projection lens is smaller.

In addition, in this embodiment of the present invention, to ensure that an observation direction of an observer is 30 degrees to 60 degrees obliquely downwards, a refraction angle $\theta_2$ of the first refraction unit 122 may be 30 degrees to 60 degrees. A size $D_L$ of an LDTE needs to meet $D_L \geq 3$ W.

$$l_7 = \frac{R_1}{\tan(\theta_2)}$$

$$l_5 = \frac{R_1}{\sin(\theta_2)}$$

The following describes an example of a specification parameter of the DMD used in this embodiment of the present invention.

By way of example rather than limitation, in this embodiment of the present invention, a pixel count of the DMD may be 1920×1080, a pixel size of the DMD may be 10 μm, and a refreshing frequency of the DMD may be 27 KHz.

Image having a bandwidth of 360 (a parallax image count)×3 (color)×25 (a dynamic display frame rate)=27 KHz may be projected by using the DMD. The DMD is placed below the projection lens with a display surface facing straight upwards, and cell images are generated sequentially.

In this example, a diameter of the projection lens is 50 mm, a focal length is 200 mm, and the projection lens is placed in front of the DMD by $l_1$=250 mm. The projection lens projects a 2D image on a corresponding position of the LDTE through the partial-reflection partial-transmission mirror and the rotary screen, and is finally projected on a 3D display region through a ray refraction function of the LDTE. A zoom-in ratio of the projection system is 4 times, a projection distance is $l_2+l_3+l_4+l_5$=1000 mm, and a size of an obtained image display window is 76.8 mm×43.2 mm.

A size of the partial-reflection partial-transmission mirror used in this example is 70 mm×70 mm, so that an entire optical path can be covered.

To reduce the size of the rotary screen, in this example, the rotary screen is placed on a back focal plane of the projection lens, that is, $l_2+l_3=f=200$ mm. Based on the foregoing requirements, an image display size is 76.8 mm×43.2 mm, and a lens focal length is 200 mm. It may be obtained based on the foregoing formula that a smallest value of the size s of the rotary screen is 25.6 mm.

Images sequentially projected by the DMD may form an annular display region in space through rotation of the rotary screen, and a diameter of the annular display region is designed into three times the size of the final image display region, that is, 76.8 mm×3=230 mm.

Figure 9:
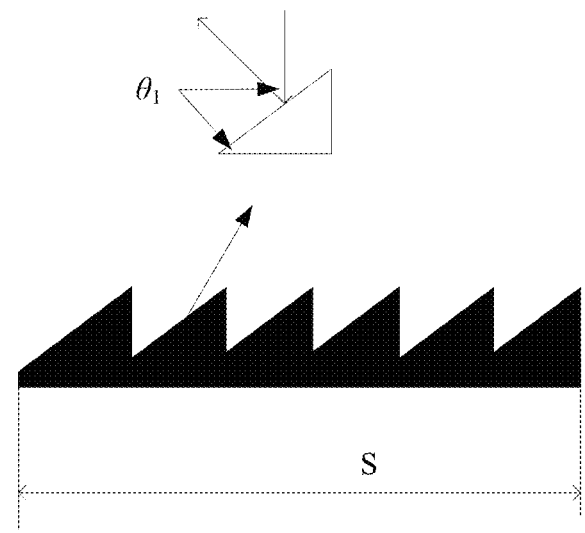
FIG. 9 is a schematic diagram of a rotary reflection unit according to an embodiment of the present invention.

In this example, the observation direction of the observer is 30 degrees obliquely downwards. Then, it can be obtained based on the formula that $l_5=154$ mm. To ensure a requirement on the projection distance, $\sin(\theta_1)=76.8/(1000-200-154)$ needs to be met. Then, a reflection angle of the prism is $\theta_1=7$ degrees, and a schematic diagram thereof is shown in FIG. 9.

Figure 10:
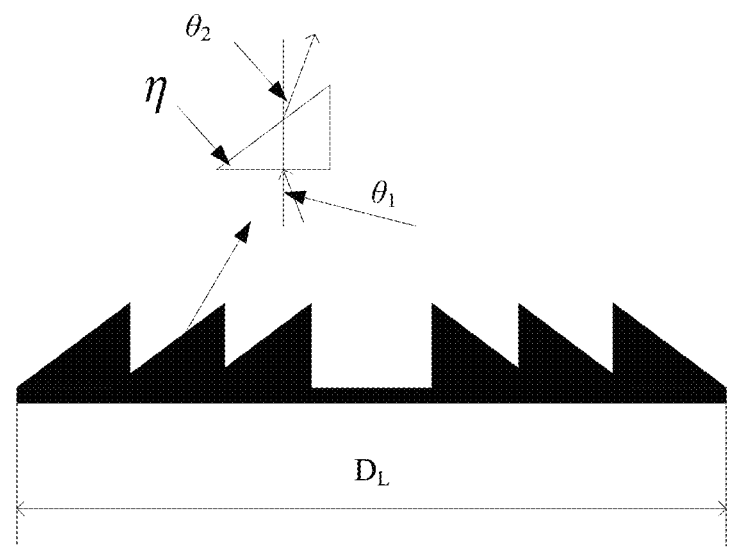
FIG. 10 is a schematic diagram of a first refraction unit according to an embodiment of the present invention.

To ensure that the observation direction of the observer is 30 degrees obliquely downwards, the refraction angle $\theta_2$ of the LDTE is designed into 30 degrees. The LDTE is designed into a circular refractive micro prism array according to requirements, and can cover the entire annular display region. Therefore, the diameter of the LDTE is 230 mm. To enable a structure of the LDTE to be thinner, in this example, one big prism is replaced with a micro prism array, and the design thereof is similar to a Fresnel lens, and each ring of the Fresnel lens is designed into a prism having a same structure and refraction angle. A schematic diagram thereof is shown in FIG. 10.

There is the following relationship based on a formula of a refraction angle of a prism:

$$\theta_2 = \arcsin\left[n \times \sin\left(\eta - \arcsin\left(\sin\left(\frac{\theta_1}{n}\right)\right)\right)\right] - \eta.$$

In this example, a refractive ratio of the prism is n=1.7, and $\theta_1$ is a refraction angle generated by the rotary screen. It may be obtained that a vertex angle $\eta$ of the prism is 37 degrees.

It should be understood that the foregoing sizes in the image display system in this embodiment of the present invention are merely an example for description, and this embodiment of the present invention is not limited thereto. A person skilled in the art may make appropriate changes to some or all sizes according to needs.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions the embodiments of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, for example, a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope the embodiments of the present invention. Any variation or replacement readily figured out by a person skilled in the art within the technical scope disclosed in the embodiments of the present invention shall fall within the protection scope of the embodiments of the present invention. Therefore, the protection scope of the embodiments of the present invention shall be subject to the protection scope of the claims.

What is claimed is:

1. An image display system, comprising:
   at least one first projection device, configured to project rays of N images on a first plane, so that the rays of the N images are projected on N first regions of the first plane, wherein the N images are images of target object photographed based on N angles, and N≥2;
   at least one first refraction device, configured on the first plane, and configured to perform refraction processing on the rays of the images projected on the first regions, so that the rays of the N images are collected on a common display region;
   at least one second projection device, configured to project rays of M images on a third plane, so that the rays of the M images are projected on M second regions of the third plane, wherein the M images are images of a target object photographed based on M angles, M≥2, an axial center of a second arc-shaped region is the same as an axial center of the first arc-shaped region, and the third plane is parallel to the first plane; and at least one second refraction device, configured on the third plane, wherein the second refraction device is configured to perform refraction processing on the rays of the images projected on the second regions, so that the rays of the M images are collected on the common display region.

2. The image display system according to claim 1, wherein
there are N first refraction devices, a first refraction device i is configured on a first region i, and the first refraction device i is configured to perform refraction processing on a ray of an image i projected on the first region i, wherein i∈[1, N], and refraction angles of refraction processing performed by the N first refraction devices are the same.

3. The image display system according to claim 1, wherein each of the at least one first projection device comprises a display device and a zoom device, wherein
the display device is configured to: display at least one of the N images, and project a ray of the at least one image on the zoom device; and
the zoom device is configured to zoom in or zoom out each of the at least one image.

4. The image display system according to claim 3, wherein there are N first projection devices, and a first projection device i is configured to project the ray of the image i, wherein i∈[1, N].

5. The image display system according to claim 4, wherein the first projection devices are specifically configured to project the rays towards a first direction, wherein the first direction is perpendicular to or approximately perpendicular to the first plane.

6. The image display system according to claim 5, wherein there are N first refraction devices, and optical axes of the N first refraction devices intersect at a position O.

7. The image display system according to claim 6, wherein the N first refraction devices are configured on a first arc-shaped region of the first plane, and
a projection of the intersection position O on the first plane is located at a center of a circle of a first arc-shaped region.

8. The image display system according to claim 6, wherein a distance d between a first refraction device i and a display device of the first projection device i is determined based on:
a distance $L_1$ between the first refraction device i and a zoom device of the first projection device i,
a focal length f of the zoom device of the first projection device i, and
a distance $L_2$ between the intersection position O and the first refraction device i, and wherein:

the first refraction device i is configured on a first region i,
the first refraction device i is configured to perform refraction processing on the ray of the image i projected on the first region i,
the first projection device i is configured to project the ray of the image i, and
i∈[1, N].

9. The image display system according to claim 3, wherein there is one first projection device, and the first projection device is configured to project the N images in N time periods;
the display device is specifically configured to present an image i in the N images in a time period i, wherein i∈[1, N]; and
the first projection device further comprises a scanning device, configured to: receive the ray of the image i in the time period i, and project the ray of the image i on the first region i.

10. The image display system according to claim 9, wherein the scanning device comprises an optical path change device and a rotary reflection device, wherein
the optical path change device is configured to: receive, in the time period i, the ray of the image i emitted by the zoom device, and project the ray of the image i on the rotary reflection device; and
the rotary reflection device is configured to project the ray of the image i on the first region i in the time period i.

11. The image display system according to claim 10, wherein the zoom device is a lens; and
a size of the rotary reflection device is determined based on a distance between the rotary reflection device and the zoom device in a direction of a main optical axis of the lens.

12. The image display system according to claim 1, wherein there are M second refraction devices, and optical axes of the M second refraction devices intersect at an intersection position O.

13. The image display system according to claim 12, wherein the first plane is the same as the third plane; and
a refraction angle φ of refraction processing performed by the second refraction device is determined based on: a refraction angle θ of refraction processing performed by the first refraction device, a radius $R_1$ of a first annular region, a radius $R_2$ of a second annular region, and a distance D between the intersection position O and the first plane.

14. The image display system according to claim 12, wherein: a distance $L_1$ between the intersection position O and the first region, a distance $L_2$ between the first plane and the zoom device of the first projection device, a distance $L_3$ between the intersection position O and the second region, and a distance $L_4$ between the third plane and a display device of the second projection device, meet:

$$L_1+L_2=L_3+L_4.$$

* * * * *